United States Patent
Hansen et al.

(10) Patent No.: US 7,616,424 B2
(45) Date of Patent: Nov. 10, 2009

(54) SURGE SUPPRESSION MODULE WITH DISCONNECT

(75) Inventors: Stephen Hansen, Fairfax, CA (US); Matthew S. Wakeham, Franklin Square, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 82 days.

(21) Appl. No.: 11/316,085

(22) Filed: Dec. 21, 2005
(Under 37 CFR 1.47)

(65) Prior Publication Data
US 2008/0019071 A1    Jan. 24, 2008

Related U.S. Application Data

(60) Provisional application No. 60/638,270, filed on Dec. 21, 2004.

(51) Int. Cl.
*H02H 3/22* (2006.01)
*H02H 1/00* (2006.01)
*H02H 1/04* (2006.01)
*H02H 9/06* (2006.01)

(52) U.S. Cl. .................. 361/111; 361/117; 361/118; 361/119

(58) Field of Classification Search .............. None
See application file for complete search history.

(56) References Cited

U.S. PATENT DOCUMENTS

| | | | | |
|---|---|---|---|---|
| 4,060,843 A | * | 11/1977 | Bost | 361/76 |
| 4,271,446 A | * | 6/1981 | Comstock | 361/56 |
| 5,914,845 A | * | 6/1999 | Chase | 361/111 |
| 6,055,147 A | * | 4/2000 | Jeffries et al. | 361/103 |
| 6,160,692 A | * | 12/2000 | Zaretsky | 361/86 |
| 6,411,482 B1 | * | 6/2002 | Funke | 361/91.1 |
| 6,879,478 B2 | * | 4/2005 | Mendoza et al. | 361/93.1 |
| 7,245,470 B2 | * | 7/2007 | Hoopes | 361/91.1 |

* cited by examiner

*Primary Examiner*—Albert W Paladini
*Assistant Examiner*—Dharti Patel
(74) *Attorney, Agent, or Firm*—Kathryn J. Milam; Paul F. Rusyn; Graybeal Jackson LLP

(57) ABSTRACT

A transient voltage suppression (TVSS) device is disclosed. The device comprises a surge module connected to a base module that connects the surge module to an electrical buss. The base module has a disconnect switch that allows the surge module to be isolated from the buss when the switch is off and connected to the buss when the switch is on. In this manner, maintenance or replacement of the surge module can be performed safely without removing power from the buss.

22 Claims, 4 Drawing Sheets

SURGE SUPPRESSION MODULE WITH DISCONNECT

This application claims the benefit of a U.S. provisional application having Ser. No. 60/638,270, which was filed Dec. 21, 2004.

BACKGROUND OF THE INVENTION

1. Field of the Invention

The present invention relates to the field of electrical devices. More specifically, this invention relates to a Transient Voltage Surge Suppressor (TVSS) comprising a disconnect switch.

2. Description of the Prior Art

Power surges are a common problem in home and commercial building electrical supply systems. A power surge, or transient voltage, is an increase in voltage significantly above the designated level in a flow of electricity. Surges or transients many times occur in bursts. In normal household and office wiring in the United States, the standard voltage is 120 volts alternating current (AC). If the voltage rises above 120 volts, it could result in damage to equipment in the household or commercial building subject to the surge.

Surge protectors are devices commonly employed to protect equipment from transient voltages. In normal operation, a surge protector does not interfere with the flow of electrical current from a supply source to a number of loads or electrical devices connected to the power supply/surge suppressor combination. If the voltage level rises above an acceptable level resulting in an unacceptably high current level, the surge protector diverts the high current away from the load. In the most common type of surge protector, a component called a Metal Oxide Varistor (MOV), absorbs the extra electrical energy thereby diverting the high electrical current away from the load. In many commercial building transient voltage protection applications, MOVs are used in conjunction with Thermal Cutoff Fuses (TCOs) to provide transient voltage protection. The TCOs are non resetting thermally sensitive devices wherein in operation, a thermal fuse melts and opens electrical contacts when temperatures exceed the rating of the thermal fuse. Most current applications comprise a TCO/MOV configuration of one TCO per two MOVs. While effective, such a configuration sometimes results in higher than desired occurrences of clamping (the triggering of the MOV to conduct electricity to ground). Moreover, in many applications conventional Transient Voltage Surge Suppressors (TVSSs) require that the electrical supply be shut off during repair or replacement of MOVs and/or TCOs. In applications such as in hospitals and the like such a shutdown of electrical power for maintenance can be inconvenient. It is desirable, therefore, to have a TVSS that can be maintained without shutting down electrical power and that can provide improved protection against transient voltage conditions.

SUMMARY OF THE INVENTION

The present invention is directed to a TVSS having a surge module that can be repaired or replaced without disconnecting power to electrical loads connected to an electrical buss. In one embodiment of the present invention, the TVSS of the present invention is coupled in parallel to a power supply buss from a distribution panel which feeds one or more loads. The TVSS comprises a surge module and a switched base unit that is connected between the surge module and the power supply buss. The switched base unit permits the surge module to be disconnected from the power supply while power to the buss and the loads are maintained thereby eliminating the need to interrupt the power supply when the surge module requires repair or replacement. In another embodiment, the surge module comprises TCOs connected in series with each MOV in the device to provide enhanced transient voltage protection and reduced clamping.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

DETAILED DESCRIPTION OF THE PREFERRED EMBODIMENT

Reference will now be made in detail to the preferred embodiments of the present invention, examples of which are illustrated in the accompanying drawings.

Figure 1:
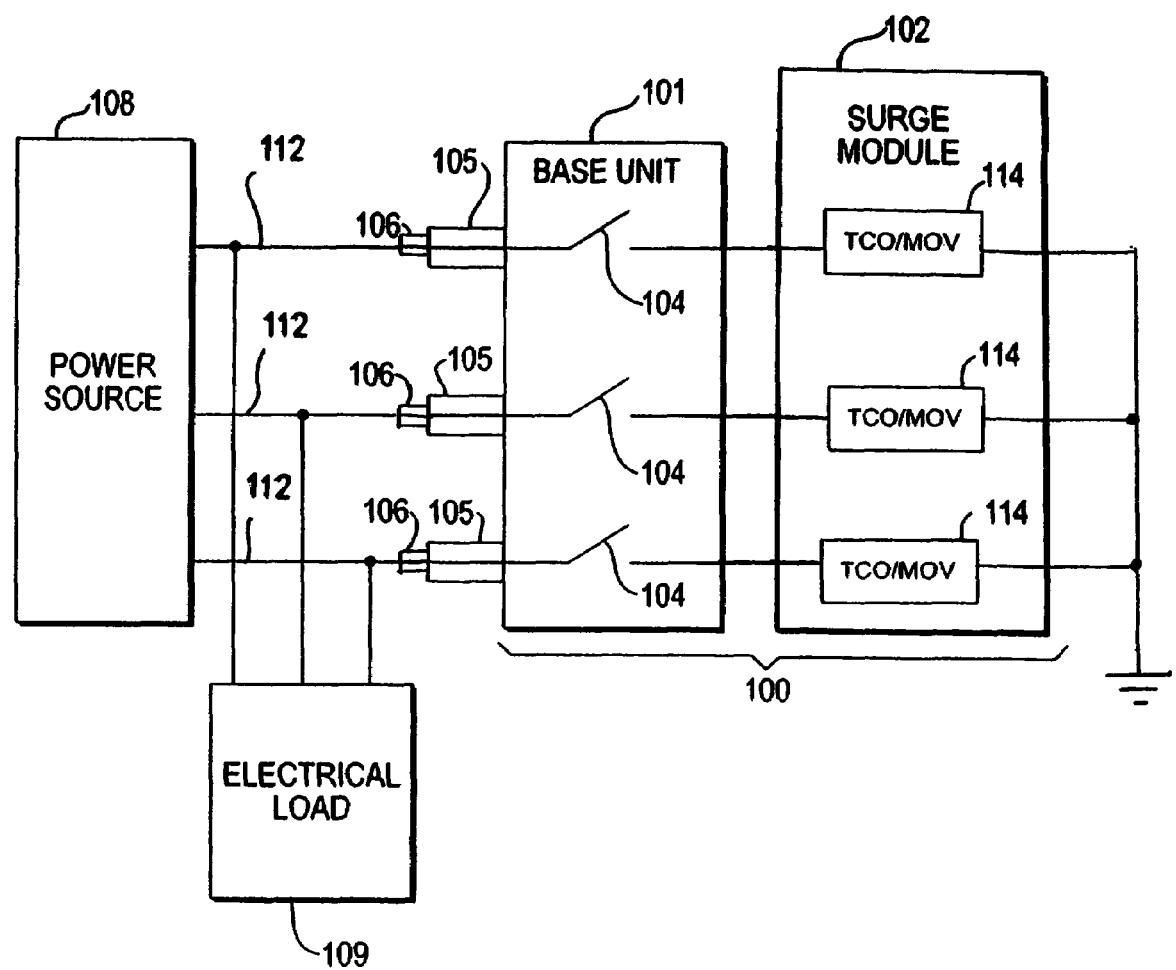
FIG. 1 is a block diagram of a modular TVSS unit in accordance with the present invention.

The present invention is directed to a TVSS that includes a surge module and a base module with a disconnect switch which disconnects the surge module from a power supply buss without interrupting power to the power supply buss. Referring to FIG. 1, shown is a TVSS unit 100 in accordance with the present invention comprising a base unit 101 having a disconnect switch 104. The base unit 101 is electrically coupled to a surge module 102. In one embodiment, the surge module 102 comprises three surge circuits 114 (e.g., a TCO in series with a MOV) each being coupled across a power (phase) conductor and a common (ground) conductor of a power source to provide protection against transient voltages. In an alternative embodiment, a surge circuit 114 can be connected across each power conductor. In a preferred embodiment, the base unit 101 and surge module 102 combination are electrically coupled to terminals 106 of a power supply buss 112 via base unit terminals 105. A power source 108, such as a three-phase alternating current (AC) power source, is electrically connected to the power terminals 106 so to provide power to an electrical load 109. The power supply buss terminals 106 can be part of a service entrance system or load distribution panel. The disconnect switch 104 has an ON (closed) position and an OFF (open) position. In the ON position, the switch 104 provides an electrical conductive path between the power source 108 and the TVSS 100 including the base unit 101 and the surge module 102. In the OFF position, which is shown in FIG. 1, the switch 104 breaks the conductive path between the power source 108 and the surge module 102 but the base unit is still energized.

In operation, when the disconnect switch 104 is moved to the ON position, the base unit 101 and the surge module 102 are energized via buss terminals 106 and base terminals 105. When the disconnect switch 104 is moved to the OFF position, or non-conducting position, the surge module 102 is electrically isolated or disconnected from the power source 108. Thus, when maintenance is required on the surge module 102, isolation of the surge module is achieved by simply turning switch 104 to the OFF position. Since this does not require interrupting power to the electrical buss 112 and to the load(s) connected to terminals 106 this feature is particularly advantageous in commercial applications such as hospitals wherein it is critical to maintain electrical power to loads even during maintenance operations.

Figure 2:
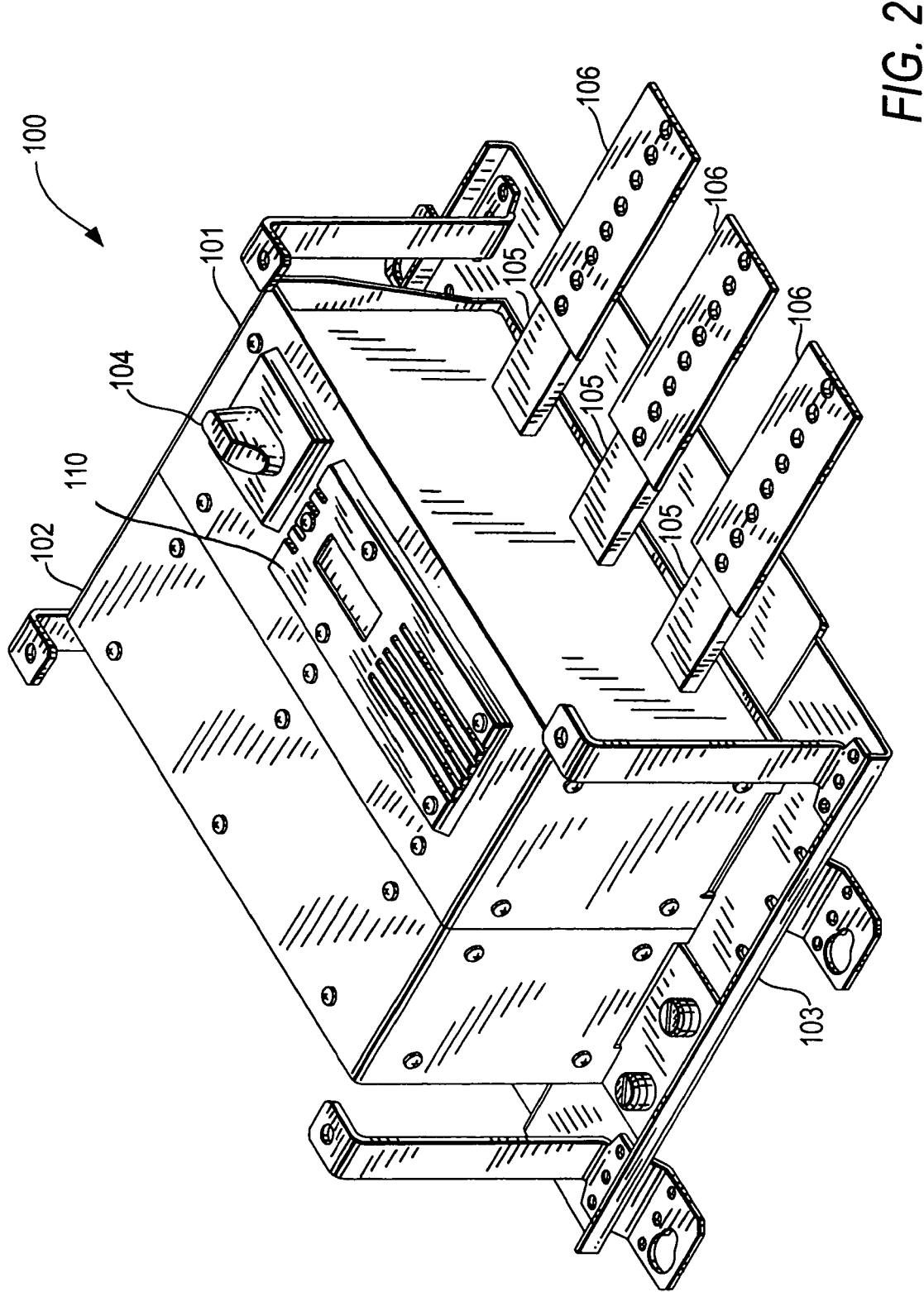
FIG. 2 is a drawing illustrating a modular TVSS unit in accordance with the present invention.

Referring now to FIG. 2, shown is an embodiment of the TVSS 100 of FIG. 1. The base unit 101 and surge module 102 are detachably mounted on a mounting tray 103 using fasteners such as screws. In one embodiment, the base unit 102 contains a diagnostics feature such as indicators 110 that provide status information related to the power source and/or the condition of the surge module 102. For example, the indicators 110 can be of the audio type (e.g., buzzers or speakers) and/or visual (e.g., light emitting diodes (LEDS)) or other forms of indicators. The switch 104 is disposed within the base unit 101. The surge module 102 and the base unit 101 are contained in separate housings to provide a modular configuration for ease of removing the surge module 102 from the mounting tray 103 for replacement or repair. For example, to repair/replace the surge module 102, a user simply moves the switch 104 to the OFF position which electrically disconnects the surge module from the power source. Power is still provided to the power supply buss while the surge module is being repaired/replaced. Once the surge module has been repaired/replaced, the new surge module can be mounted to the base unit 101 and the switch 104 is then moved to its ON position which electrically reconnects power to the surge module 102.

Figure 3:
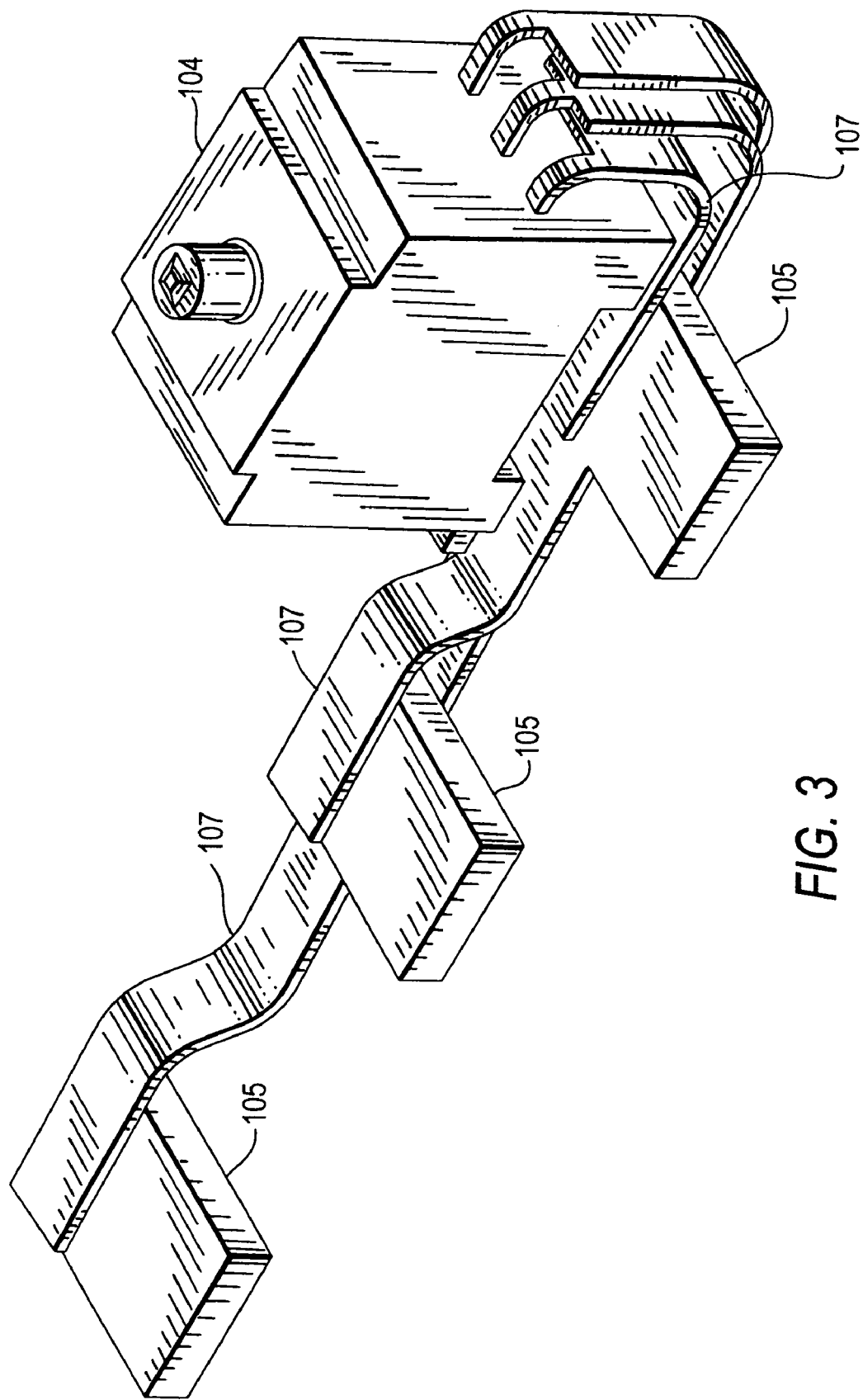
FIG. 3 is a drawing illustrating buss attachment point details of a TVSS unit in accordance with the present invention.

Referring now to FIG. 3, disclosed therein are buss attachment details for the TVSS 100 depicted in FIG. 2. As shown therein, disconnect switch 104 is connected to terminals 105 via conductors 107. In the preferred embodiment, conductors 107 are made of copper and are attached to terminals 105 via bolts (not shown). Thus, when switch 104 is in its ON position, current is transferred from buss terminals 106 (see FIG. 3) through terminals 105 and conductors 107 to switch 104 and thus to surge module 102. In contrast thereto, when switch 104 is in its OFF position, current flow terminates at switch 104 and surge module 102 is therefore isolated from the electrical buss connected to terminals 105 and can be accessed for maintenance or replacement without interrupting power to the electrical buss and to the load(s).

Figure 4:
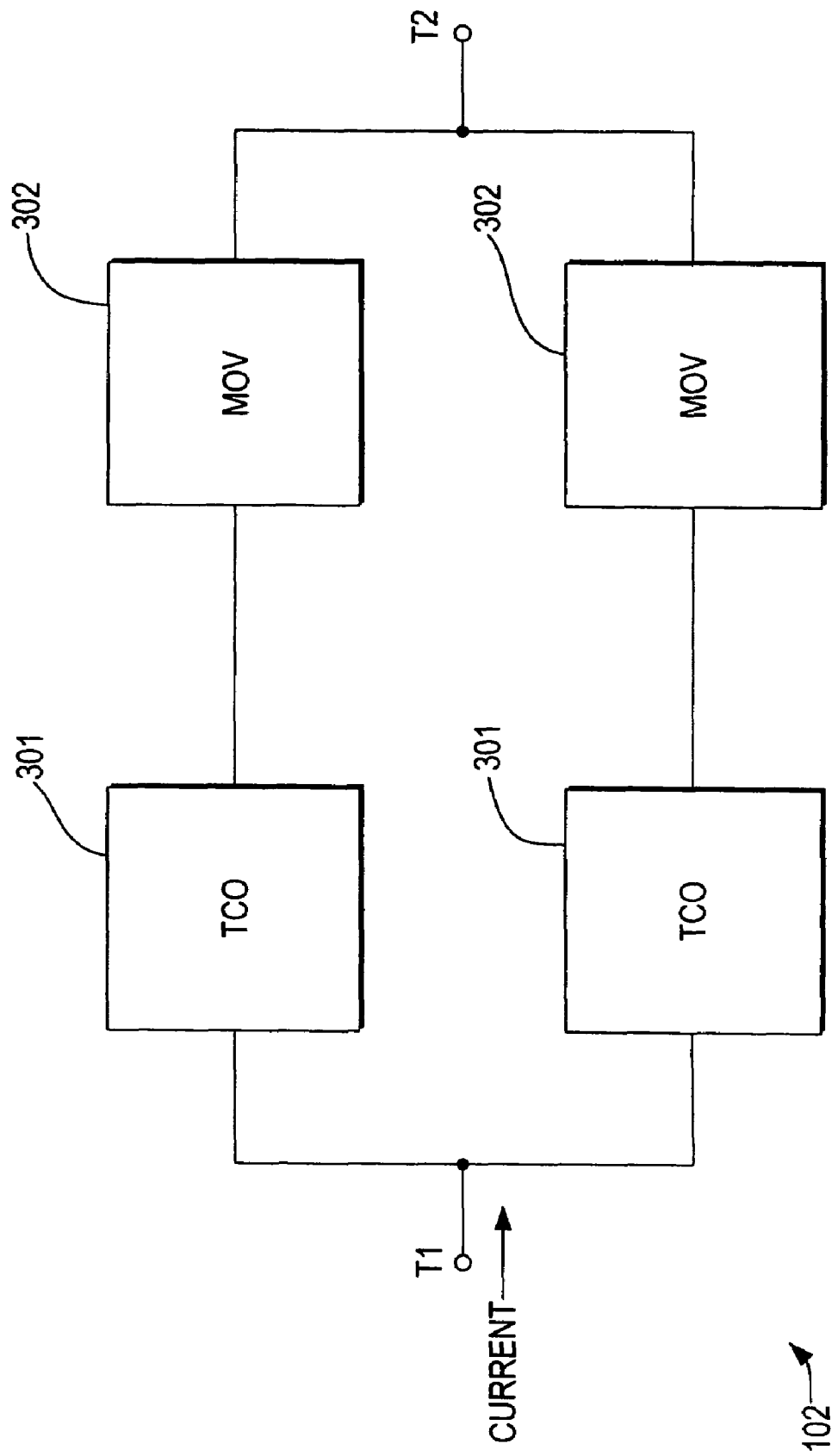
FIG. 4 is a schematic illustrating the layout of a pair of TCOs and MOVs in accordance with a preferred embodiment of the present invention.

FIG. 4 details the configuration of the TCOs and MOVs which comprise a portion of the surge module 102 of FIG. 1 according to an embodiment of the present invention. For simplicity, only one pair of TCOs and MOVs are shown but it is to be understood that any number of MOVs and TCOs may be implemented in a surge module in accordance with the present invention. As is depicted in FIG. 4, in the preferred embodiment of the present invention the TCOs 301 are implemented in series with MOVs 302. By combining TCO 301 with MOVs 302 in this manner, each MOV 302 is subject to individual protection unlike conventional applications wherein a single TCO is connected in parallel to two MOVs.

The TCOs 301 may be located in close proximity to the MOVs 302 so that the TCOs 301 can sense an increase in the surface temperature of the MOVs 302 and trip to a high impedance state thereby protecting the MOVs 302. One end of the series combination of MOVs 302 and TCOs 301 is connected to a first terminal T1 and the other end of the combination is connected to a second terminal T2. The terminals T1, T2 can be connected to terminals 105 through switch 104 (FIG. 1). In one embodiment, terminal T1 can be connected to a power (phase) conductor and terminal T2 can be connected to a ground conductor. In another embodiment, terminal T1 can be connected to a power (phase) conductor and terminal T2 can be connected to another power (phase) conductor of a three-phase buss system. That is, the surge module 102 can be electrically connected in parallel to the terminals of a buss system.

As further depicted in FIG. 4, the MOV 302 and TCO 301 can be connected in parallel to further enhance the performance of surge module 102 by reducing the occurrences of clamping due to a lower voltage drop and higher surge current performance resulting from the parallel configuration of the TCOs 301.

In operation, referring to FIGS. 1 and 4, when the switch 104 is in the ON position, the surge module 102 is electrically connected across the terminals 106 of a three-phase buss and capable of suppressing transient voltages or power surges that may be present across the buss. Upon the occurrence of a transient voltage, a corresponding transient current flows through terminal T1, TCOs 301, MOVs 302, through terminal T2 and to a ground conductor, for example. As a result, the surge module 102 helps absorbs some the transient current thereby diverting the transient voltage away from any load connected across the buss terminals. However, the transient current causes the temperature of the MOVs 302 to increase, and because the TCOs 301 are located in close proximity to the MOVs 302, the TCOs 301 sense the increase in the surface temperature of the MOVs 302 and trip to a high impedance state thereby protecting the MOVs 302 from damage due a further increase in the surface temperature. For example, the TCOs 301 help prevent the MOVs 302 from overheating and from possibly exploding. During normal operation, that is when there are no transient voltage conditions present, the series combination of TCOs 301 and MOVs 302 is in a high impedance state and thus no current flows through the series combination. In this case, the surge module 102 allows power to be delivered to a load across the buss terminals.

On the other hand, when the switch 104 is in the OFF position, the surge module 102 is electrically isolated from the power source allowing a user to conduct maintenance procedures such as testing or replacing the surge module without having to disconnect power from the load. The surge module 102 may need to be replaced or repaired because the TCO/MOVs may have become damaged. For example, when a surge voltage condition occurs, current from the surge voltage is diverted through the MOVs which may increase the temperature of the MOVs. The thermal fuses of the TCOs associated with the MOVs may melt causing the TCOs to form an open circuit between the TCOs and the MOVs. As a result, the TCOs and/or MOVs are damaged and need to be replaced or repaired. As explained above, the present invention allows the surge module 102 to be removed for maintenance without disconnecting power to the load.

While the invention has been described in detail and with reference to a specific embodiment, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A transient voltage suppression device comprising:
a suppression module adapted to divert transient voltages away from an electrical load; and
a disconnect module having a manually operable switch for coupling said disconnect module to said suppression module and a current source wherein said manually operable switch is operable to be actuated between an ON position and an OFF position responsive to user input, when said manually operable switch is in an ON position, said suppression module and said electrical load are coupled to said current source and when said manually operable switch is in an OFF position, said suppression module is isolated from said current source while said electrical load remains coupled to said current source.

2. The device of claim 1 wherein said suppression module comprises at least one suppression circuit comprising a metal oxide varistor coupled in series with a thermal cutoff fuse.

3. The device of claim 1 wherein said suppression module is housed separately from the disconnect module.

4. The device of claim 1 wherein said suppression module is connected across one or more pairs of power bus terminals.

5. The device of claim 1 wherein said current source comprises a three-phase power source, and further wherein said disconnect module comprises terminals configured to be coupled to said three-phase power source.

6. The device of claim 1 wherein said disconnect module is connected to the current source via one or more bus bars at a service entrance panel.

7. The device of claim 1 wherein said base unit comprises a status indicator operable to provide status information related to a condition of said suppression module.

8. A transient voltage suppression device, comprising:
a suppression module including at least one suppression element operable to divert transient voltages that may be present on an output from a power source away from an electrical load connected to the power source; and
a switching module including at least one manually operable switch operable to be actuated between a first state and a second state responsive to user input, the at least one manually operable switch operable to couple the power source to the suppression module and the electrical load when in the first state, and couple the power source to the electrical load and not to the suppression module when in the second state.

9. The transient voltage suppression device of claim 8 wherein the at least one manually operable switch of the switching module comprises a plurality of switches.

10. The transient voltage suppression device of claim 8 wherein the at least one suppression element comprises a metal oxide varistor coupled in series with a thermal cutoff fuse.

11. The transient voltage suppression device of claim 8 wherein the switching module comprises a status indicator operable to provide status information related to a condition of the suppression module.

12. A method, comprising:
setting at least one switch of a base unit to an OFF state so that a suppression module is disconnected from a power source while the power source remains coupled to an electrical load;
servicing the base unit when the at least one switch is in the OFF state;
wherein setting at least one switch of a base unit to an OFF state so that a suppression module is disconnected from a power source while the power source remains coupled to an electrical load comprises manually setting the at least one switch to the OFF state.

13. The method of claim 12, further comprising:
after the servicing, setting the at least one switch to an ON state so that the base unit is coupled to the power source and the suppression module.

14. The method of claim 12 wherein servicing the base unit when the at least one switch is in the OFF state comprises replacing the base unit with a different base unit.

15. The method of claim 14, further comprising coupling the different base unit to the power source and the suppression module.

16. The method of claim 12 wherein setting at least one switch of a base unit to an OFF state so that a suppression module is disconnected from a power source while the power source remains coupled to an electrical load comprises setting the at least one switch to the OFF state responsive to user input.

17. A transient voltage suppression system, comprising:
a power bus adapted to be coupled to at least one electrical load and to a power source;
a transient voltage surge suppression module coupled to the power bus, the transient voltage surge suppression module including,
a mounting tray configured to be mounted to service equipment including a service entrance branch or any type of load distribution panel,
a surge module contained in a first housing that is detachably attached to the mounting tray, the surge module operable when connected to the power bus to suppress transients on the power bus;
a base module contained in a second housing that is detachably attached to the mounting tray, the base module and surge module being independently attachable to and detachable from the mounting tray, and the base module connected to the power bus and to the surge module and being operable responsive to user input to selectively connect the surge module to the power bus and to isolate the surge module from the power bus.

18. The transient voltage suppression system of claim 17 wherein the base module is attached to the power bus through a plurality of conductive terminals, each of these terminals protruding through the second housing and being adapted to connect to the power bus.

19. The transient voltage suppression system of claim 18 wherein each conductive terminal includes a bus terminal, each bus terminal including a plurality of holes that connect the terminal to the power bus through a suitable connector.

20. The transient voltage suppression system of claim 19 wherein the base module further comprises an indicator positioned on a top side of the second housing, the indicator operable to provide an indication of an operating status of at least one of the power source and the surge module.

21. The transient voltage suppression system of claim 20 wherein the base module further comprises a switch positioned on the top side of the second housing, the switch being operable responsive to user input to selectively connect the surge module to the power bus and to isolate the surge module from the power bus.

22. The transient voltage suppression system of claim 21 wherein the base module further comprises a plurality of conductive segments, each conductive segment extending between a corresponding conductive terminal and the switch and having a longitudinal axis extending substantially parallel to a first side of the second housing, and wherein each conductive terminal and bus terminal extend substantially orthogonal to the first side of the second housing.

* * * * *

UNITED STATES PATENT AND TRADEMARK OFFICE
CERTIFICATE OF CORRECTION

| | | |
|---|---|---|
| PATENT NO. | : 7,616,424 B2 | Page 1 of 1 |
| APPLICATION NO. | : 11/316085 | |
| DATED | : November 10, 2009 | |
| INVENTOR(S) | : Hansen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 188 days.

Signed and Sealed this

Fourteenth Day of December, 2010

David J. Kappos
*Director of the United States Patent and Trademark Office*